No. 811,065. PATENTED JAN. 30, 1906.
F. JAEGER.
COPYING APPARATUS.
APPLICATION FILED NOV. 4, 1905.

Witnesses:
Arthur Zumper.
William Schulz.

Inventor:
Ferdinand Jaeger
by Frank v. Briesen Att'y.

UNITED STATES PATENT OFFICE.

FERDINAND JAEGER, OF NEW YORK, N. Y.

COPYING APPARATUS.

No. 811,065. Specification of Letters Patent. Patented Jan. 30, 1906.

Application filed November 4, 1905. Serial No. 285,828.

*To all whom it may concern:*

Be it known that I, FERDINAND JAEGER, a citizen of the United States, residing at New York city, Brooklyn, county of Kings, State of New York, have invented new and useful Improvements in Copying Apparatus, of which the following is a specification.

This invention relates to an apparatus for copying the outlines of a body by tracing the reflection of such body in a mirror. In this way the face of the operator, as well as other solid bodies, may be reproduced in a simple and accurate manner.

Figure 1:
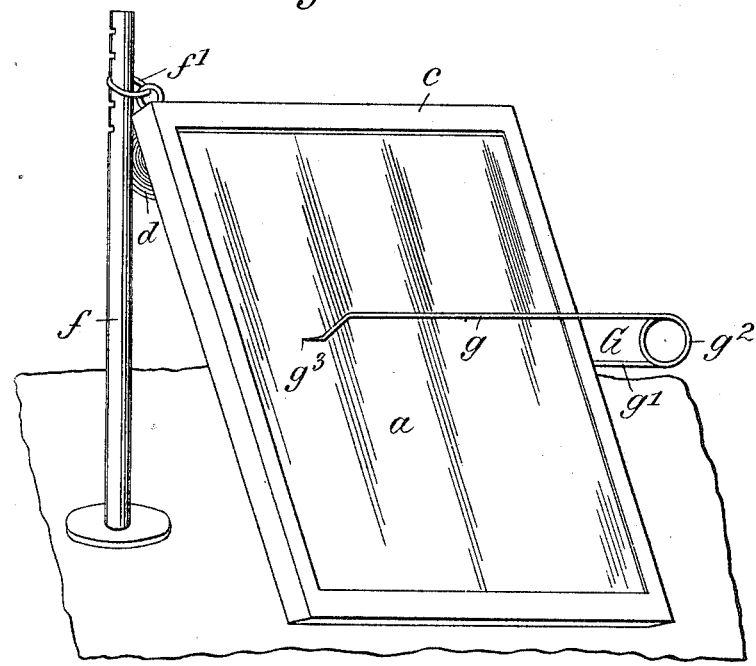
Figure 2:
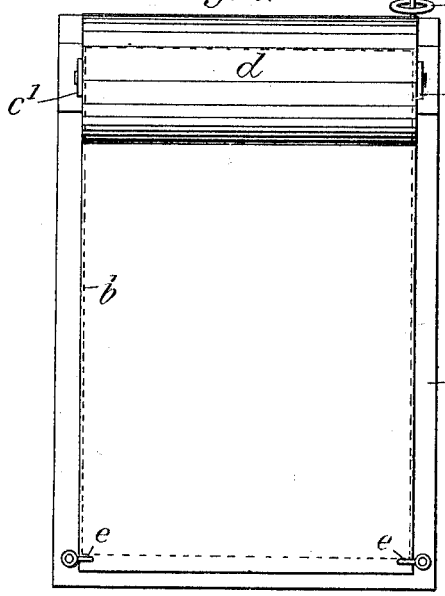
Figure 3:
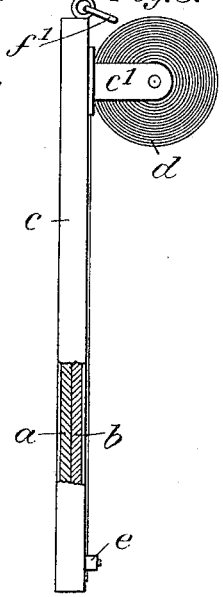
Figure 4:
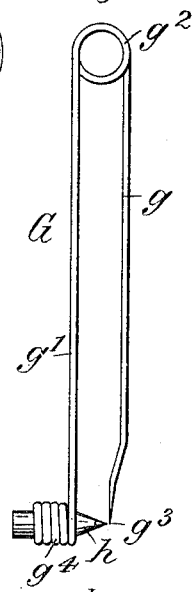

In the accompanying drawings, Figure 1 is a perspective view of my improved copying apparatus. Fig. 2 is a rear view of the combined reflector and slate; Fig. 3, an end view, partly in section, thereof; and Fig. 4, a side view of the tracer.

The copying apparatus consists of two parts—viz., first, a mirror from which the object to be copied is reflected and which has a copy-receiving back, and, second, a U-shaped tracer which by following the contour of the image along the mirror reproduces it upon the back.

The letter $a$ indicates a mirror or other reflector, to the back of which is secured a slate $b$, of like size, by a common surrounding frame $c$. To the upper rail of frame $c$ there is hung in rearwardly-projecting bearings $c'$ a paper-roller $d$. The lower or free end of the strip of paper may be secured to the bottom of frame $c$ by catches $e$. A notched post $f$, engaging a ring $f'$ at one corner of frame $c$, permits the device to be supported at any desire inclination.

The tracer is composed of a U-shaped length of wire G, adapted to straddle frame $c$, and provided with a front arm $g$, an integral rear arm $g'$, and a coiled connecting-spring $g^2$. The front arm $g$ is turned inward near its free end, so that its tracing-point $g^3$ lies flat against the surface of mirror $a$. The rear arm $g'$ is coiled at its free end to form the tubular holder $g^4$ of a slate or lead pencil $h$.

In use the tracer G is so manipulated that its point $g^3$ follows the picture of a body reflected in mirror $a$, one eye of the operator being closed. As the tracer is thus drawn over the mirror the pencil $h$ will produce a copy of the picture at the back of the mirror. When it is desired to have the copy reproduced upon slate $b$, the paper on roller $d$ remains wound up, while when the picture is to be reproduced on paper the latter is unwound from the roller and fastened over the slate by the catches $e$.

It will be seen that my improved copying apparatus may be readily manipulated and that it presents ready means for reproducing articles in nature in a simple and accurate manner.

What I claim is—

1. In a copying apparatus, a mirror, a slate at the back thereof, and a surrounding frame, combined with a U-shaped tracer adapted to straddle the frame and to simultaneously engage the mirror and slate, substantially as specified.

2. In a copying apparatus, a mirror, a slate at the back thereof, and a surrounding frame, combined with a U-shaped tracer composed of a front arm having a tracing-point, a rear arm having a pencil-holder, and an integral connecting coiled spring, substantially as specified.

Signed by me, at New York city, Manhattan, New York, this 3d day of November, 1905.

FERDINAND JAEGER.

Witnesses:
 FRANK V. BRIESEN,
 WILLIAM SCHULZ.